Oct. 10, 1967 S. F. OVENS ETAL 3,346,839

ECHO-SOUNDING APPARATUS FOR EXAMINING STRATA BELOW THE SEA-BED WITH VARIABLE GAIN MEANS RESPONSIVE TO SEA-BED ECHOES

Filed May 24, 1965 2 Sheets-Sheet 1

STANLEY FREDERICK OVENS
GEOFFREY HAROLD ELLIS
INVENTORS

BY
Hall, Pollock + Vande Sande
ATTORNEYS

Oct. 10, 1967 S. F. OVENS ET AL 3,346,839

ECHO-SOUNDING APPARATUS FOR EXAMINING STRATA BELOW THE SEA-BED WITH VARIABLE GAIN MEANS RESPONSIVE TO SEA-BED ECHOES

Filed May 24, 1965 2 Sheets-Sheet 2

STANLEY FREDERICK OVENS
GEOFFREY HAROLD ELLIS
INVENTORS

BY

Hall, Pollock & Vande Sande
ATTORNEYS

United States Patent Office 3,346,839

Patented Oct. 10, 1967

3,346,839

ECHO-SOUNDING APPARATUS FOR EXAMINING STRATA BELOW THE SEA-BED WITH VARIABLE GAIN MEANS RESPONSIVE TO SEA-BED ECHOES

Stanley Frederick Ovens and Geoffrey Harold Ellis, Cricklewood, London, England, assignors to S. Smith & Sons (England) Limited, Cricklewood, London, England, a British company

Filed May 24, 1965, Ser. No. 458,260

Claims priority, application Great Britain, May 29, 1964, 22,377/64

6 Claims. (Cl. 340—7)

The present invention relates to echo-sounding apparatus for examining strata below the sea-bed, that is layers of sand, rock, etc. lying below the interface between the water and the bottom. For this purpose it is necessary to be able to discriminate between the sea-bed echo-signal, which has a large amplitude, and echo-signals of smaller amplitude from strata below the sea-bed.

In the first place there is a risk that some strata echo-signals will be obscured by the "tail" of the bottom echo-signal. Secondly, the amplitude of the strata echoes falls off rapidly with depth below the sea-bed because of attenuation in the strata and the dynamic range of the amplifier and recording system will be insufficient to record these weak strata echoes without being overloaded by the bottom echo. It is therefore necessary to provide some means of modifying the relative amplitudes of the sea-bed and lower strata echo-signals so that the latter may be detected.

In accordance with the invention there is provided echo-sounding apparatus for examining strata below the sea-bed including a receiving transducer, a receiver amplifier connected between the receiving transducer and an indicating device to amplify the received echo signals, and a control circuit responsive to the receipt of a sea-bed echo-signal to generate a control waveform which is applied to the receiver amplifier to vary its gain in such a manner that the gain has a low value when the sea-bed echo-signal is received and subsequently rises progressively to a higher value.

It is desirable that the control circuit should be adjustable to change the magnitude of the difference between the low and high values and the rate of rise from one to the other.

Preferably the control waveform is arranged to maintain the gain at the low value until the receipt of the sea-bed echo-signal and then cause it to rise to the high value but it is also possible for the gain to be rapidly reduced to the low value upon receipt of the sea-bed echo-signal and then allowed to recover to its former level.

A delay device may be connected between the receiving transducer and the control circuit to delay the sea-bed echo-signal before its application to the control circuit by such a period that one sea-bed echo-signal generates the control waveform for the passage of the next sea-bed echo-signal through the receiver amplifier.

In a preferred form of the invention the gain of the receiver amplifier is again reduced at the time when the first sea-bed re-echo is received, thus avoiding interference with strata echoes received at about this time.

Figure 1:
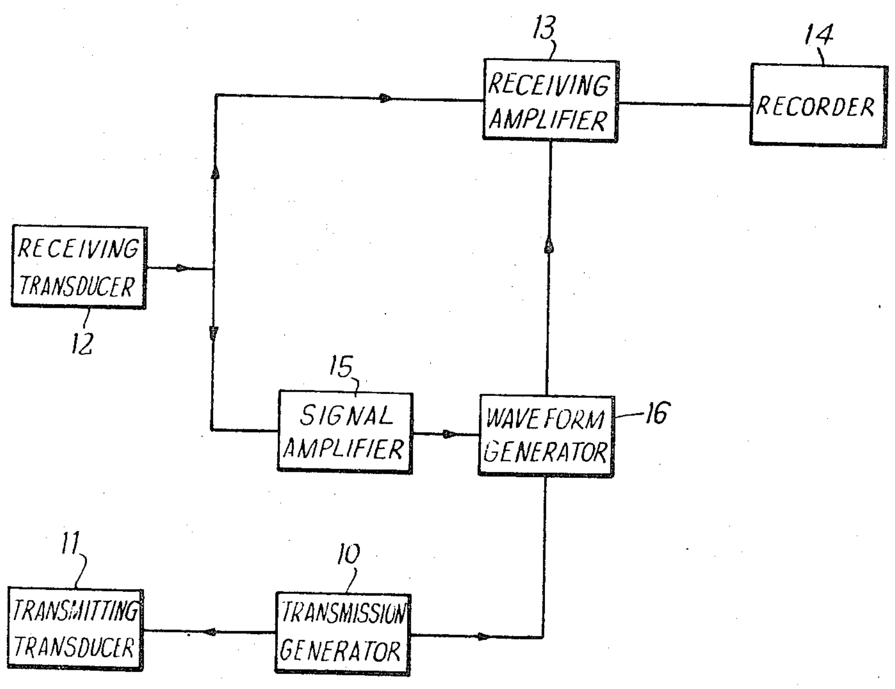
Figure 2:
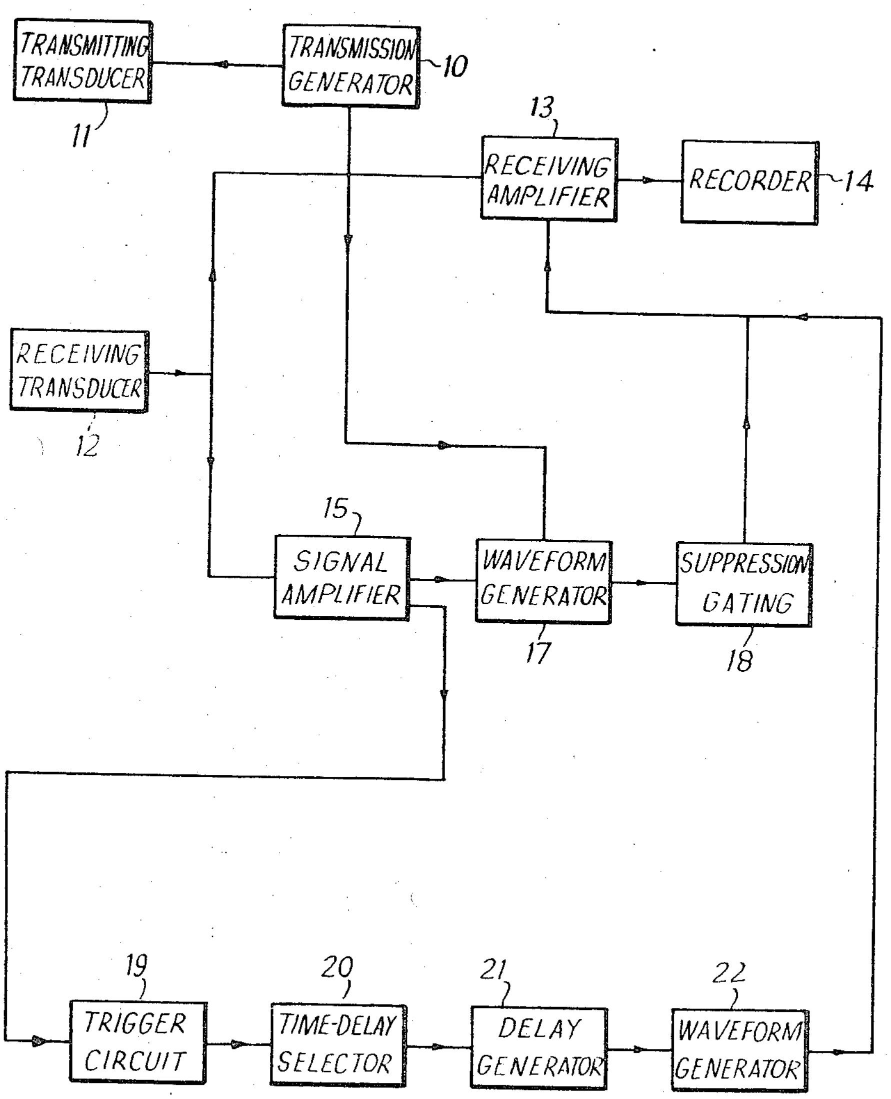

The invention will now be described in more detail with the aid of examples illustrated in the accompanying drawings, in which:

FIG. 1 is a block circuit diagram of a simple form of echo-sounding apparatus in accordance with the invention and FIG. 2 is a block circuit diagram of a preferred form of apparatus including means for eliminating the disturbing effects of the first sea-bed re-echo.

In both figures a transmission generator 10 generates electrical pulses which are applied to a transmitting transducer 11 which transmits into the sea pulses of pressure wave energy at ultrasonic or high sonic frequencies. The reflected echoes of these pulses are picked up by a receiving transducer 12 and the echo-signals from the transducer 12 are passed through a receiver amplifier 13 to a recorder 14. The arrangement described thus far is entirely conventional and standard components may be used. The same transducer may, if desired, be used for transmission and reception. The operation of the transmission generator may be controlled by the recorder to ensure the required timing.

Referring now to FIG. 1, the echo-signals from the transducer 12 are also passed to a fixed-gain signal amplifier 15. They are then applied to a waveform generator 16 responsive only to signals of large amplitude. A transmission suppression pulse is applied to the waveform generator 16 from the transmission generator 10 when a pulse is being transmitted to prevent the waveform generator 16 responding to a signal produced by direct passage of the transmitted pulse to the receiving transducer. The next large amplitude signal to be received is the sea-bed echo-signal and this triggers the waveform generator 16 to produce a control bias waveform which is applied to control the gain of the receiver amplifier 13. The gain of the amplifier 13 is kept constant or progressively increased to compensate for the decreasing strength of echo-signals from greater distances by means of a sensitivity control signal. The means for achieving this are entirely conventional and are not shown in the figure. The control bias waveform from the waveform generator 16 is superimposed on the sensitivity control signal to produce a sharp drop in gain upon the receipt of the sea-bed echo-signal followed by a progressive recovery to the level determined by the sensitivity control signal.

The strata echo-signals are thereby amplified to a greater extent than the bottom echo-signal and are recorded despite their small amplitude. Moreover the "tail" of the bottom echo-signal, caused by reverberation, is recorded at a low level and strata echo-signals can be detected within the tail by the increase in the intensity of the recording which they produce.

The gain of the signal-amplifier 15 is set at such a value that the bottom echo-signal will always be of sufficient amplitude to trigger the waveform generator 16 independent of the depth from which it is received. The waveform generator is adjustable ta change individually the initial value, rate of decay and final value of the control bias waveform.

A delay circuit may be provided between the signal amplifier 15 and the waveform generator 16 having a delay such that the sea-bed echo-signal from one transmitted pulse triggers the waveform generator for the reception of echoes of the next transmitted pulse.

In the apparatus of FIG. 2 the echo-signals from the receiving transducer 12 are again amplified by a signal amplifier 15 and applied to a waveform generator 17. The waveform generator 17 generates an output waveform different from that generated by the waveform generator 16 of the apparatus of FIG. 1. A transmission suppression pulse from the transmission generator 10 is applied to the waveform generator 17 as before. The sea-bed echo-signal triggers the waveform generator to produce a gating waveform consisting of a positive-going pulse of constant amplitude which commences immediately upon receipt of the sea-bed echo-signal and ends after the end of the recording period. This gating waveform is applied to a suppression gating circuit 18, whose output is applied to control the gain of the amplifier 13. A suppression bias is normally applied to the amplifier 13 to keep the gain at a low value. When the positive-going edge of the gating waveform is applied to the gating circuit 18 it closes a diode gate, that is, a switch, for example, a transistor, causing the bias to fall exponentially by the discharge of a capacitor until the gain reaches a predetermined higher level. This higher level, and the rate at which it is reached, are adjustable to give the best setting for any given conditions of use. After the end of the recording period the opening of the diode gate causes the gain to fall again to a low level. This arrangement has the advantage that until the receipt of the first sea-bed echo, no echoes are recorded on the chart, thus clearer recordings are obtained.

The apparatus of FIG. 2 also provides for suppression of the first sea-bed re-echo, produced by reflection successively from the sea-bed, the water surface and the sea-bed. The echo-signals from the amplifier 15 are applied to a trigger circuit 19. The trigger circuit 19 is triggered "on" by the transmitted pulse received directly by the transducer 12 and "off" by the next large amplitude signal, that is the sea-bed echo-signal. It produces two pulses, corresponding to the receipt of the transmitted pulse and the sea-bed echo-signal, whose time separation is a measure of the depth of the sea-bed below the transducer. These pulses are applied to a time-delay selector circuit 20 which generates a reference voltage proportional to the time separation between thm. The reference voltage is applied to a delay generator 21 to control the delay introduced. An additional adjustable delay is provided to take account of the fact that the transducers 11 and 12 are below the surface of the water and the sea-bed re-echo therefore does not occur after an interval following the transmission which is exactly equal to twice the interval after which the sea-bed echo occurs. The delay generator 21 is triggered by the selector circuit 20 when the transmission pulse is applied to the selector circuit from the trigger circuit and the delayed output pulse is applied to a controllable waveform generator 22 which produces a suppression bias waveform which is superimposed on that from the waveform generator 17. The amplitude and rate of decay of the suppression bias waveform from the waveform generator 22 can be controlled to give the required supression of the sea-bed re-echo while allowing strata echoes to be recorded. This will in general differ from the suppression applied to the first sea-bed echo both in magnitude and time of rise.

It will be obvious from the foregoing that the waveform generator 17 and suppression gating circuit 18 of FIG. 2 are interchangeable with the waveform generator 16 of FIG. 1. Also, the circuit of FIG. 2 may include a delay circuit or circuits between the receiving transducer 12 and the waveform generators 17 and 22 having a delay equivalent to the transmission period so that each sea-bed echo-signal controls the gain of the receiving amplifier for the receipt of the following sea-bed echo-signal.

We claim:

1. Echo sounding apparatus for examining strata below the sea-bed comprising transmitter means for transmitting mechanical-wave energy towards the sea-bed, receiver means for receiving echoes of the transmitted energy to derive signals in accordance respectively with received sea-bed and strata echoes, display means responsive to said signals to provide a display of echoes received by the receiver means, and suppression means for attenuating the sea-bed echo-signal relative to the strata echo-signals, said suppression means comprising a controllable-gain amplifier coupled between said receiver means and said display means for passing said signals derived by said receiver means to said display means, and control means for controlling the amplifier-gain to increase from a low value during passage through the amplifier of the sea-bed echo-signal to a higher value during passage through the amplifier of the immediately-following strata echo-signals, said control means including first means triggerable to supply a predetermined control signal having at least a portion thereof that changes as a predetermined function of time from a first value to a second value, second means responsive to reception of the sea-bed echo by said receiver means to trigger said first means to supply said control signal, and third means coupled to the amplifier to increase the amplifier-gain immediately following passage through the amplifier of said sea-bed echo-signal, said third means being responsive to supply of said control signal by said first means to increase said amplifier-gain in accordance with change in said control signal from said first value to said second value.

2. Echo sounding apparatus for examining strata below the sea-bed comprising transmitter means for transmitting mechanical-wave energy towards the sea-bed, receiver means for receiving echoes of the transmitted energy to derive signals in accordance respectively with received sea-bed and strata echoes, display means responsive to said signals to provide a display of echoes received by the receiver means, and suppression means for attenuating the sea-bed echo-signals relative to the strata echo-signals, said suppression means comprising a controllable-gain amplifier coupled between said receiver means and said display means for passing said signals derived by said receiver means to said display means, and control means for controlling the amplifier-gain to increase from a low value during passage through the amplifier of each said sea-bed echo-signal to a higher value during passage through the amplifier of the immediately-following strata echo-signals, said control means including means responsive to reception of sea-bed echoes to derive trigger signals each synchronized in time to passage through said amplifier of a respective one of the sea-bed echo-signals, and means responsive to each said trigger signal immediately to increase the gain of the amplifier as a predetermined function of time from said low value to said higher value.

3. Echo sounding apparatus for examining strata below the sea-bed comprising transmitter means for transmitting mechanical-wave energy towards the sea-bed, receiver means for receiving echoes of the transmitted energy to derive signals in accordance respectively with received sea-bed and strata echoes, display means responsive to said signals to provide a display of echoes received by the receiver means, and suppression means for attenuating the sea-bed echo-signal relative to the strata echo-signals, said suppression means comprising a controllable-gain amplifier coupled between said receiver means and said display means for passing said signals derived by said receiver means to said display means, and control means for controlling the amplifier-gain to increase progressively from a low value during passage through the amplifier of the sea-bed echo-signal to a higher value during passage through the amplifier of the immediately-following strata echo-signals, said control means including first means to apply to said amplifier a substantially constant control bias for maintaining the amplifier-gain at said low value, second means coupled to said receiver means for detecting reception of the sea-bed echo, and third means responsive to detection by said second means of the reception of a sea-bed echo to increase the amplifier-gain progressively from said low value immediately following passage through the amplifier of said sea-bed echo-signal.

4. Echo sounding apparatus for examining strata below the sea-bed comprising transmitter means for transmitting pulses of mechanical-wave energy towards the sea-bed, receiver means responsive to echoes of the transmitted pulses for deriving signals in accordance with received sea-bed and strata echoes, display means responsive to said signals to provide a display of echoes received by the receiver means, suppression means for attenuating the sea-bed echo signals relative to the strata signals, said suppression means comprising a controllable-gain amplifier coupled between said receiver means and said display means for passing said signals derived by the said receiver means to said display means, first control means for controlling the amplifier-gain of the amplifier to increase from a low value during passage through the amplifier of each said sea-bed echo-signal to a higher value of gain during the passage through the amplifier of the immediately-following strata echo-signals, and second control means for decreasing the amplifier-gain temporarily during passage of a sea-bed re-echo signal through the amplifier, said second control means including a waveform generator that is selectively operable to apply a control waveform to the amplifier to reduce the amplifier-gain temporarily, and a delay circuit, for operating said waveform generator with a delay following each transmitted pulse, said delay circuit being responsive to the interval between each transmitted pulse and the consequent sea-bed echo to delay operation of the waveform generator for a period dependent upon said interval.

5. Echo sounding apparatus according to claim 4 wherein the delay circuit comprises a trigger circuit coupled to said receiver means to derive a first output pulse on receipt of a transmission pulse and a second output pulse on receipt of a sea-bed echo-signal, a time-delay selector circuit coupled to said trigger circuit to derive an output voltage determined by the time separation of the first and second output pulses, and delay means responsive to said output voltage to operate the waveform generator at a time after said first output pulse dependent upon said output voltage.

6. Echo sounding apparatus for examining strata below the sea-bed comprising transmitter means for transmitting mechanical-wave energy towards the sea-bed, receiver means for receiving echoes of the transmitted energy to derive signals in accordance respectively with received sea-bed and strata echoes, utilization means responsive to said signals derived by said receiver means, and suppression means for attenuating the sea-bed echo-signal relative to the strata echo-signals, said suppression means comprising a controllable-gain amplifier, circuit means coupling said amplifier between said receiver means and said utilization means for passing said signals derived by said receiver means to said utilization means via said amplifier, detector means coupled to said circuit means at a point between said receiver means and said amplifier to detect at said point sea-bed echo-signals derived by said receiver means, and control means responsive to detection of a sea-bed echo-signal by said detector means to increase the amplifier-gain immediately following passage through the amplifier of a sea-bed echo signal.

References Cited

UNITED STATES PATENTS

| | | | |
|---|---|---|---|
| 2,318,624 | 5/1943 | Petty et al. | 340—7 X |
| 2,324,816 | 7/1943 | Born | 340—15.5 |
| 2,583,531 | 1/1952 | Hathaway | 1—3 |
| 2,866,512 | 12/1958 | Padberg | 181—0.5 |
| 3,119,091 | 1/1964 | Hopkin et al. | 340—3 |
| 3,136,974 | 6/1964 | Sirks | 340—15.5 |
| 3,145,363 | 8/1964 | Haslett | 1—1 |
| 3,147,459 | 9/1964 | McCarter | 340—15.5 |

BENJAMIN A. BORCHELT, *Primary Examiner.*

W. KUJAWA, *Assistant Examiner.*